United States Patent [19]

McCornack

[11] 3,965,922
[45] June 29, 1976

[54] ANTI-SIPHON FLUSH VALVE CONSTRUCTION

[76] Inventor: Robert R. McCornack, 980 N. Broad St., Galesburg, Ill. 61401

[22] Filed: Nov. 25, 1974

[21] Appl. No.: 526,796

[52] U.S. Cl. ............................... 137/218; 251/214
[51] Int. Cl.² ............................................. F16K 24/00
[58] Field of Search ..................... 137/329.1–329.4, 137/218, 636.4, 454.6; 251/39, 214, DIG. 1; 277/177

[56] References Cited
UNITED STATES PATENTS

| | | | |
|---|---|---|---|
| 1,123,801 | 1/1915 | Robinson | 137/329.2 |
| 1,226,175 | 5/1917 | Bibleheiser | 137/329.1 |
| 1,716,183 | 6/1929 | Possons | 137/636.4 X |
| 2,328,382 | 8/1943 | Langdon | 137/218 |
| 2,647,810 | 8/1953 | McCuistion | 277/177 |
| 2,754,840 | 7/1956 | Hicks | 277/177 X |
| 3,279,746 | 10/1966 | Arnold | 251/214 |
| 3,363,652 | 1/1968 | James | 137/329.4 X |
| 3,400,731 | 9/1968 | McCornack | 251/39 X |
| 3,487,435 | 12/1969 | Sheardown | 137/454.6 |
| 3,511,470 | 5/1970 | Beckett et al. | 137/454.6 |
| 3,842,857 | 10/1974 | McCornack | 251/39 X |

Primary Examiner—Henry T. Klinksiek
Attorney, Agent, or Firm—McDougall, Hersh & Scott

[57] ABSTRACT

A flush valve construction consists of a jacket and piston assembly for controlling fluid flow. An integral metering passage stop and vacuum breaker are associated with the piston assembly for controlling the operation of the valve. Operable means are adapted for displacement of the piston assembly and adjustment of the stop. Repair and adjustments can be made without disturbing associated plumbing.

18 Claims, 7 Drawing Figures

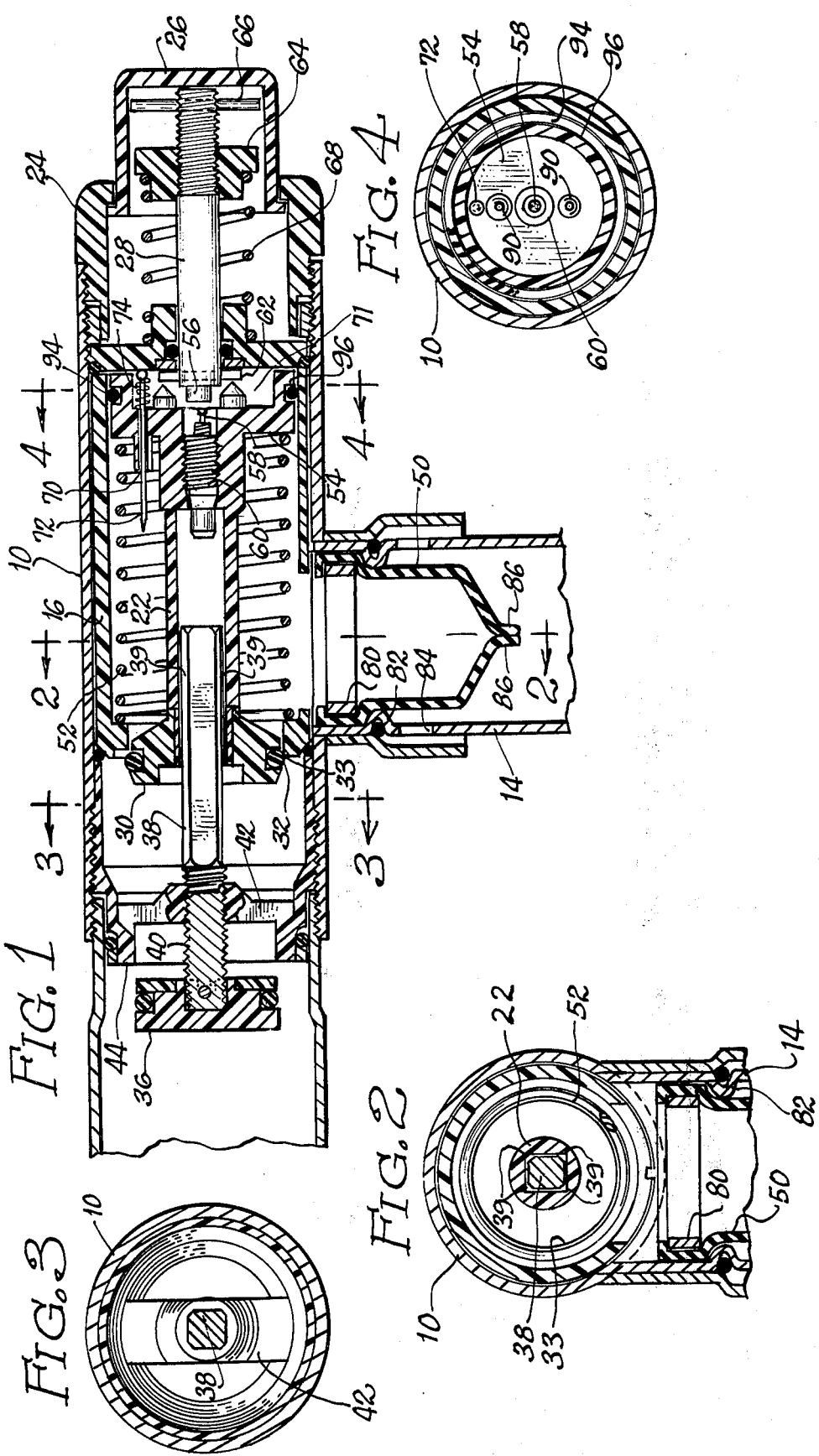

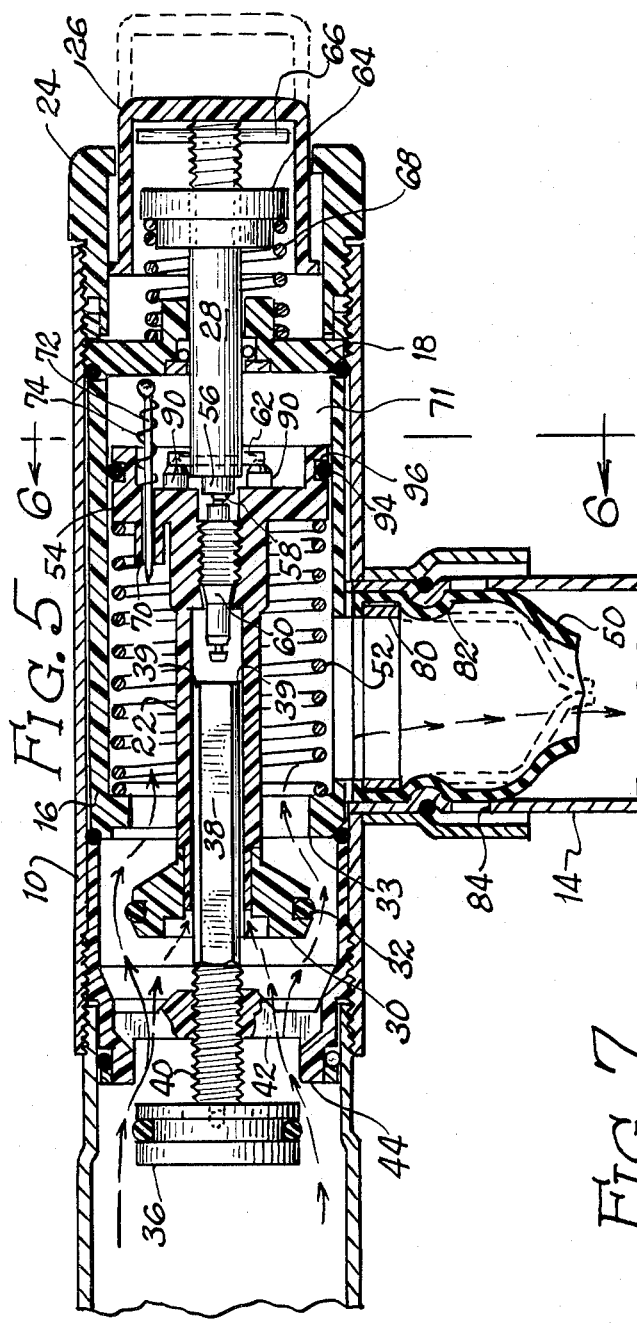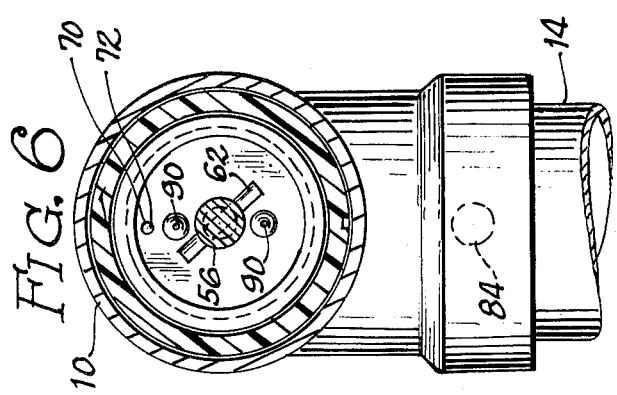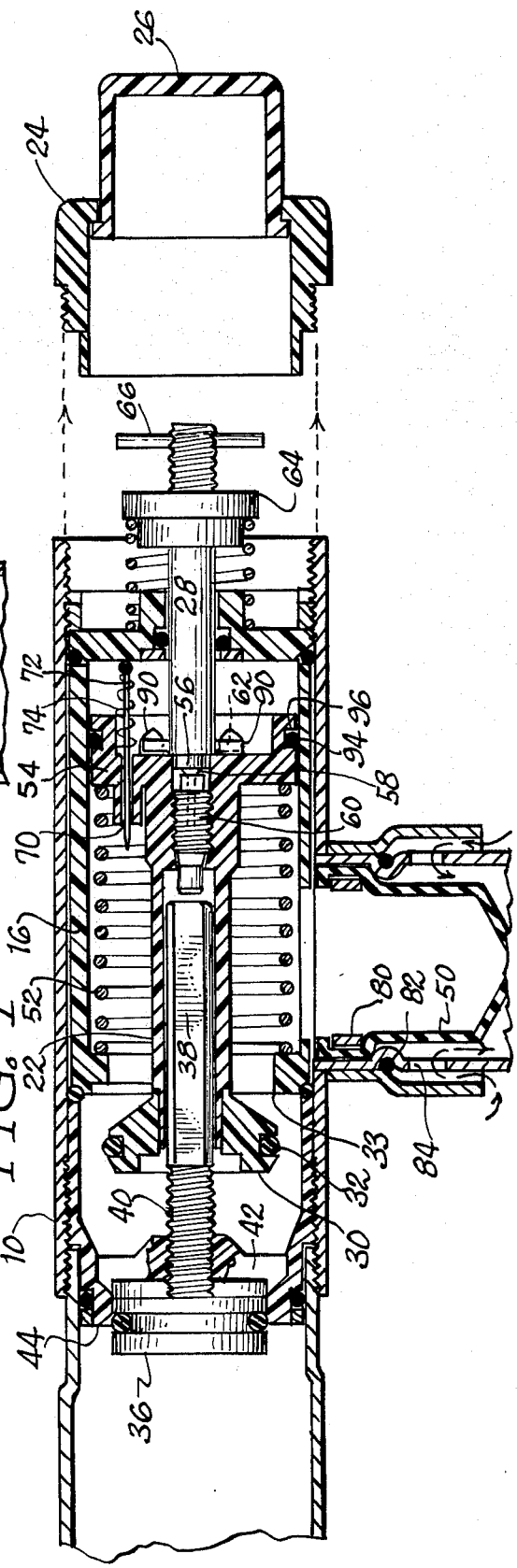

ANTI-SIPHON FLUSH VALVE CONSTRUCTION

This invention relates to a valve employed for metering fluids, in predetermined quantities. Valves of this type are commonly used for flushing toilets, urinals and other applications.

Valves of the type relating to this invention are disclosed in applicant's U.S. Pat. No. 3,400,731, issued on Sept. 10, 1968, and in U.S. patent application Ser. No. 348,515, filed May 7, 1973, now U.S. Pat. No. 3,842,857. The present design emphasizes the use of a pin arrangement which is associated with a metering passage for controlling the time interval the valve is in the open position, thereby controlling the amount of fluid passing through the construction. A forward stop is provided adapted to adjust or shut off fluid flow to the device when it is desired. Additionally, the present construction utilizes no internal walls for supporting the valve piston but rather a novel arrangement whereby a fitted gasket forms a movable sealing element permitting the valve to be mounted on a fully floating piston.

It is a general object of this invention to provide an improved design which is characterized by a highly reliable mode of operation.

It is a further object of this invention to provide a design which includes means for providing self-cleaning metering passages whereby the reseating action of the cycle of valve operation can be precisely controlled and uniformly maintained.

It is another object of the invention to provide a valve construction having an independent shut-off incorporated therein to permit access to the valve and integral vacuum breaker for repair or replacement without disturbing the plumbing attachments.

It is still a further object of the invention to provide a valve piston assembly free from the need for internal support for the piston.

These and other objects of this invention will appear hereinafter, and for purposes of illustration, but not of limitation, specific embodiments of the invention are shown in the accompanying drawings in which:

FIG. 1 is a longitudinal cross-sectional view illustrating the metering valve construction of the invention;

FIG. 2 is a sectional view through the flush valve along the lines 2—2 of FIG. 1 illustrating the water passages through the flush valve piston;

FIG. 3 is a similar view taken along the lines 3—3 of FIG. 1 illustrating the manner in which the stop shaft is mounted to the forward assembly on a cross member;

FIG. 4 is a cross-sectional view taken along the lines 4—4 of FIG. 1 and illustrates the lug construction of the piston table;

FIG. 5 is a view similar to FIG. 1 wherein the flush valve is in its actuated position permitting water to pass from the inlet to the outlet;

FIG. 6 is a cross-sectional view taken along the lines 6—6 of FIG. 5 illustrating the manner of operating the stop; and FIG. 7 is a view similar to FIG. 5 illustrating the manner of disassembly.

The construction of this invention generally comprises a valve associated with an open passage. The assembly comprises a cylindrical jacket and a piston assembly within for normally closing one end of the passage. An actuating means is employed for displacing the piston assembly to open access through the jacket whereby fluid can exhaust.

A stop assembly is provided anterior of the flush valve and functions for flow adjustment or as a shutoff. The stop is opened or closed by means integral with the flush valve.

Cycling means include a pressure chamber which is located posterior of the flush valve and which communicates with a small valve structure associated with the piston assembly. When activated, this small valve structure permits entry of fluid or gas into the pressure chamber to hydraulically displace the piston assembly. After the desired directional movement of the piston assembly has been achieved, it is reciprocally urged, by fluid pressure and spring means, toward its original seated position. The interval of return movement is controlled by means of a metering passage communicating with the aforementioned pressure chamber permitting a predetermined discharge flow of fluid from the chamber whereby the interval during which the valve is unseated is controlled.

The metering passage consists of a cylindrical passage encircling a pin, the passage being slightly larger in diameter than the diameter of the pin.

Referring now to FIG. 1, the invention is adapted to be situated in a cylindrical jacket, section 10, which is connected to a source of fluid such as water. The upstream end of the jacket section is connected to a fluid supply. The fluid exhausts through jacket section 14. Flush valve piston 22 is sealingly disposed within jacket 10. Adapted to threadingly engage the jacket section 10 at the posterior end is a cap assembly 24 having a push-button type actuator 26 mounted therein. A rod type plunger 28 is actuated by operation of the push button 26 for operating the piston 22 in a manner to be described.

On the upstream end of the piston 22 is a valve construction 30 adapted to sealingly engage a seat 33.

Disposed forwardly of the valve 30 is a stop 36. The stop is mounted to a shaft 38 having threads 40 on a portion thereof for movement in a cross member 42. As will be appreciated from FIG. 1, when the stop is in the position illustrated, fluid passes around it to the valve assembly 30 where it is controlled by actuation of the push button 26 in a manner to be described. Alternatively, and as illustrated in FIG. 7, when it is desired to render the flush valve inoperative and prevent fluid flow therethrough, the stop shaft 38 is rotated so that the stop 36 seats against the structure 44 which is secured in jacket 10.

As shown in FIG. 5, fluid passing the open stop 36 next passes actuated valve 30 and exhausts through jacket section 14. Suspended within jacket section 14 is a vacuum breaker bulb 50 adapted to prevent possible reverse flow if the fluid supply upstream is exhausted. When the flush valve is operated, fluid passes through the vacuum breaker bulb by separating the lower lip portions thereof as illustrated in FIG. 5.

It will be appreciated that the valve 30 mounted to the piston 22 is normally maintained in the sealing position shown in FIG. 1 due to the effects of a coil spring 52 disposed against valve seat 33 and a table portion 54 of the piston 22. An additional force tending to maintain the valve 30 in a seated position is the pressure of the fluid against the valve in its normally closed position. In order to actuate the valve 30 and move it from its closed position to the open position illustrated in FIG. 5, the push button 26 is depressed causing the rod 28 to be carried inwardly towards the piston table 54. Integral to the bottom portion of the rod 28 is a projection 56 of reduced diameter. This projection is adapted to pass into a recessed portion of the piston table 54 to actuate valve stem 58 of a valve 60, thereby allowing fluid to enter through channels 39 into sealed chamber 71 urging piston 22 upstream.

A stroke adjusting member 64 is provided on the threaded end of the rod 28. A spring 68 is abutted thereto to urge the rod 28 to its fully extended position following actuation whereby the projection 56 is disengaged from the valve stem 58 thus enabling piston 22 to move downstream. The stroke adjusting member serves to determine the depth to which the rod 28 penetrates when the push button is actuated.

A metering orifice 70 in table portion 54 communicates the flow area with a pressure chamber 71 formed between the piston table portion 54 and the end plate 18. The orifice 70 is provided with an anti-clogging pin 72. A spring 74 causes a reciprocating movement of the pin in the orifice each time the piston is operated. Escape through the orifice 70 controls the rate of return of the piston after the valve has been actuated. This is accomplished due to the fact that the fluid enters the pressure chamber 71 when the valve stem 58 is depressed during the actuation of the push button 26. As shown in FIG. 5, as the push button is depressed, the entire piston assembly is urged forward including the valve 30 permitting the majority of fluid to pass around the valve and exhaust into the jacket section 14. A small portion of the fluid, however, passes instead through the hollow interior of the piston 22 and through the valve 60 into the chamber 71. The fluid which enters into the chamber prevents the immediate return of the piston assembly upon release of the push button to the closed position. When the push button is released, the valve 60 closes preventing return of the fluid through the valve. The only remaining passage for the water out of the chamber 71 is through the metering orifice 70 back to the interior of the flow area. The rate of the fluid passage through the orifice 70 controls the rate of return of the piston and accordingly the amount of time that the flush valve will permit water to pass.

Referring to FIG. 2, the manner in which water passes through the interior of the piston 22 is illustrated. The piston 22 has a hollow interior preferably of substantially rectangular cross section. The shaft 38 from the stop slidably engages the hollow interior of the piston 22. The shaft 38 is desirably of octagonal cross section thereby to form fluid channels 39. Thus, the piston 22 serves both as a mechanical link for rotating the shaft 38, for operating the stop and as a fluid conducting conduit for communicating water pressure to the valve 60 (FIG. 5) for selectably permitting it to enter the chamber 71. Obviously other shapes could be employed for the piston interior, i.e., a triangular shape with a hexagonal shaft 38.

As shown by FIG. 5, the device is operated by depressing the push button 26 causing the rod 28 to advance until its projection 56 engages valve stem 58 opening valve 60. The valve 60 permits fluid to flow through the hollow interior of the piston 22 producing hydraulic pressure in chamber 71. Increasing insertion of the rod 28 advances the piston 22 inwardly and away from the end plate 18. As the piston is urged inwardly, the valve 30 is unseated from the seat 33, thereby permitting fluid to flow.

As soon as the push button 26 is released, the rod 28 is withdrawn from the table 54 due to the urging of the coil spring 68 against the stroke adjusting member 64. This releases the valve stem for valve 60 thereby closing it and trapping the fluid in pressure chamber 71.

During the period when the valve 30 is unseated, there are two forces acting on the valve and piston seeking to return it to its seated position. The first is the flow of the fluid past the valve, and the second is the urging of the coil spring 52. Thus, as soon as the rod 28 is no longer urging the piston 22 into the extended position, it tends to return to reseat the valve 30. Preventing an immediate return of the piston, however, is the fluid trapped in the chamber 71. This fluid must be exhausted through the metering orifice 70 before the valve can reseat. The metering orifice is of a selected diameter so that after the push button is released, it will take a selected interval for the trapped fluid to pass into the flow area via the metering orifice 70. This provides for the desirable delay between the time that the push button is released and the time when the flush valve again seats to shut off the supply. It is noted that each time the push button is depressed and released the pin 72 provided in the metering orifice is reciprocated by the spring biasing device so that the metering orifice is maintained free of foreign matter.

By adjustment of the stroke adjusting member 64, the amount of water which is trapped within the chamber 71 may be varied, as desired, thereby determining the length of time it requires for the valve to cycle.

As indicated in FIGS. 1 and 5, the vacuum breaker bulb 50 provided in the jacket section 14 is secured in the assembly by means of a stiffening ring 80 which suspends the bulb against the conduit 14 at an inwardly projecting section 82. Downstream of section 82 are openings 84 for venting the interior of the conduit 14 to the atmosphere. It will be appreciated by those skilled in the art that this arrangement is advantageous during a loss of fluid pressure upstream. Such a situation might cause a vacuum condition which could produce a reverse flow through the valve possibly contaminating the supply. The vacuum breaker bulb 50 in conjunction with the venting openings 84 prevent this from occurring. When the valve is dormant, the vacuum breaker bulb appears as illustrated in FIG. 1 with the lower lip portions 86 in a substantially sealing engagement. If a vacuum should develop, air may enter through the ports 84 and collapse the bulb so to accomplish a seal against the vacuum.

When the flush valve is cycled the vacuum breaker appears as illustrated in FIG. 5. The vacuum breaker bulb expands to permit fluid flow through conduit 14 while at the same time expanding so as to seal the openings 84 to prevent fluid from leaking therefrom. After the valve reseats, the vacuum breaker bulb again assumes the position illustrated in FIG. 1.

As has been stated, the stop 36 is mounted to a threaded shaft 38 which shaft may be octagonal in cross section along a rear portion thereof. The threaded portion 40 of the shaft is supported in a secured cross member 42. Rotation of the shaft 38 varies the position of the stop between the position indicated in FIG. 5 wherein fluid passes freely and the position indicated in FIG. 7 wherein a sealing relationship is established.

A principal feature of the present invention is the capability of operating the stop 36 from the push-button end of the device. This feature permits adjusting flow to the valve 30 and also servicing it without shutting off the fluid supply at a remote location.

Considering now the operation of the stop 36, reference is made to FIGS. 2, 4, 6 and 7. As illustrated in FIG. 2, the shaft 38 of the stop passes into the hollow socket shaped interior of the piston 22. Provided on the piston table 54 are a pair of turning lugs 90. These lugs are adapted to be engaged by the cross pin 62 attached to the rod 28 of the actuating assembly. As will be apparent, rotation of the rod 28 while at the same time depressing the rod so that the pin 62 engages the turning lugs 90 effects a rotation of the flush valve piston 22. Since the shaft 38 of the stop is secured in the hollow interior of this piston, its rotation is effective for rotating the shaft 38 thereby causing movement of the stop 36 between the seated and unseated positions.

In order to effect movement of the stop, it is first necessary to remove the push-button 26 and the cap 24 by unscrewing them from the jacket 10. Once this is accomplished, manual pressure on the rod 28 is effective for depressing the pin 62 into engagement with the turning lugs 90. Simple rotation of the rod 28 opens or closes the stop 36. Once the stop is seated, the flush valve assembly and vacuum breaker bulb may be removed. After removal of the assemblies, they may be serviced or replaced as desired.

Another significant feature of the present invention resides in the manner in which the flush valve piston is suspended during cycling. In prior constructions and in particular the devices cited in the introductory portion of the specification employ an internal support arrangment for the flush valve piston. In the present device no internal support is necessary for the flush valve piston. The necessary linearity of movement of the flush valve piston 22 between the seated and unseated positions is accomplished by use of a resilient gasket 94 in conjunction with groove 96 having a recessed area for receiving the gasket. The circular gasket 94 is smaller in section and larger in diameter than its adjacent sealing surfaces. It presses outwardly to accomplish a dynamic seal with its mated cylinder and simultaneously seals one of the perpendicular walls of groove 96 thereby permitting piston 22 freedom to rotate and reciprocate.

While the invention has been illustrated and described as being a valve with two separate jacket sections, it will be apparent to those skilled in the art that the valve can be formed as a unitary jacket with two sections. In that case the piston assembly is changed when necessary without removing the unitary jacket.

While I have shown and described embodiments of this invention in some detail, it will be understood that this description and illustrations are offered merely by way of example, and that the invention is to be limited in scope only by the appended claims.

I claim:

1. In a valve construction for controlling fluid flow through a first jacket section having a fluid inlet and outlet, a piston, means for mounting the piston for reciprocal and rotational movement in said jacket section, means for actuating said piston, a valve mounted to said piston to control fluid flow at the jacket inlet, the improvement comprising:
    a. a socket provided in said piston at the inlet of said jacket section for receiving a shaft therein;
    b. a second jacket section disposed forwardly of said first section;
    c. a shaft threadingly engaged in said second section, the rear portion of said shaft extending to a position of engagement with said socket; and
    d. a stop mounted to said shaft controlling fluid flow through the inlet end of said second jacket section, said stop being movable by rotation of said piston between a seated position in sealing engagement with said second jacket section preventing fluid flow to said first section and an unseated position permitting a selectable amount of fluid flow.

2. The device of claim 1 further including a vacuum breaker bulb suspended in the outlet of said jacket to prevent reverse flow through said valve.

3. The device according to claim 2 wherein said vacuum breaker bulb is suspended by a cylindrically shaped stiffening ring.

4. The device of claim 1 wherein said second section is secured forward of said first section whereby when said stop is seated to prevent fluid flow the piston and said actuating means may be removed for servicing.

5. The device of claim 1 wherein said socket comprises a recess in said piston adapted to releasably receive said shaft for rotation therein whereby rotation of said piston rotates said shaft.

6. The device of claim 1 wherein said socket is formed in the hollow interior of said piston, said interior having a cross section adapted to engage said shaft whereby rotation of said piston rotates said shaft.

7. The device of claim 6 wherein the rear portion of said shaft is octagonal in cross section and said hollow interior is rectangular in cross section and of a dimension adapted to receive said rear portion of said shaft therein.

8. The device of claim 1 wherein said second jacket section has a cross member to which said shaft is threadingly engaged whereby rotation of said shaft in said cross member effects seating and unseating of said stop according to the direction of rotation.

9. The device of claim 1 wherein said actuating means includes means for rotating said piston to effect operation of said stop.

10. A valve construction for controlling fluid flow through a first jacket section having an inlet and outlet comprising:
    a. a valve adapted to seat against said jacket inlet;
    b. a piston means in said first jacket section to which said valve is mounted for reciprocal movement between seated and unseated positions, said piston means rotatable in said first section and having a socketing and fluid conducting interior;
    c. means for unseating said valve to initiate fluid flow through said first jacket;
    d. biasing means to return said valve to the seated position to cease fluid flow through said first jacket;
    e. metering means receiving fluid through said fluid conducting interior of said piston means for controlling the rate of return of said valve to the seated position;
    f. a second jacket section having an inlet and outlet and disposed forwardly of said first section;
    g. a stop for sealing the second jacket section inlet;
    h. a shaft to which said stop is mounted engaged to said second jacket section, the rear portion of said shaft extending to a socketed position in the interior of said piston means; and
    i. means rotating said piston means for rotating said socketed shaft to move said stop between a seated position at the inlet of said second jacket and an unseated position, said stop when seated permitting said first jacket section, piston means and valve to be removed for servicing.

11. The device of claim 10 wherein said second jacket section is independently mounted forwardly of said first jacket section whereby when said stop is seated to prevent fluid flow to said first jacket section, the latter may be removed for servicing.

12. The device of claim 10 wherein said hollow interior of said piston means is rectangular in cross section and said rear portion of said shaft is octagonal in cross section.

13. The device of claim 10 wherein said shaft threadingly engages a cross member on said second jacket section, rotation of said shaft in said cross member effects seating and unseating of said stop according to the direction of rotation.

14. The device of claim 10 wherein said means for actuating includes:
 a. a push button for operating said device;
 b. a rod engaged by said push button for displacing said piston means;
 c. means for biasing said rod to restore it to its initial position upon release of said button; and
 d. means for adjusting the distance the piston means is displaced by said rod.

15. The device of claim 10 wherein said piston means includes a table portion at the end thereof remote from said valve for guiding said piston means in said jacket.

16. The device according to claim 15 wherein said metering means includes:
 a. a fluid-tight pressure chamber defined between said table portion and said actuating means;
 b. means for conducting fluid to said chamber only when said actuating means is operated and preventing fluid flow at other times; and
 c. a passage having a selected diameter to limit fluid flow therethrough between said pressure chamber and said jacket interior for permitting fluid conducted to said chamber to be gradually exhausted therefrom, said piston means exhausting said chamber as said biasing means urges said piston means to the seated valve position whereby said valve cannot seat until a selected metering portion of said fluid is exhausted from said pressure chamber.

17. The device according to claim 16 wherein said passage has a means for maintaining said passage free from blockage by foreign matter and the like comprising a pin member of a diameter smaller than said passage extending therethrough and a spring concentrically mounted to said pin member whereby operation of said actuating means causes a compression and expansion of said spring thereby causing said pin member to move reciprocally in said passage to prevent blockage thereof.

18. The device according to claim 15 wherein means for rotating includes lugs mounted on said table portion for rotating said piston means, said means for actuating includes means for engaging said lugs whereby said piston means is rotated by rotating said actuating means while said lug engaging means engages said lugs on said table portion.

* * * * *